(No Model.)
B. POTTER.
SAW GAGE DEVICE.
No. 536,651. Patented Apr. 2, 1895.
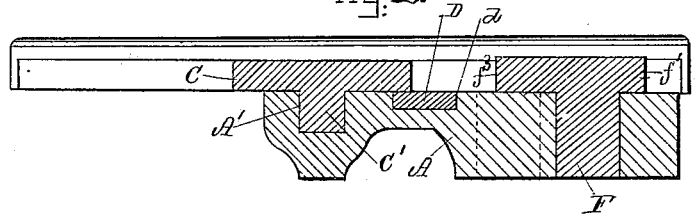
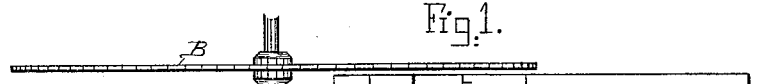
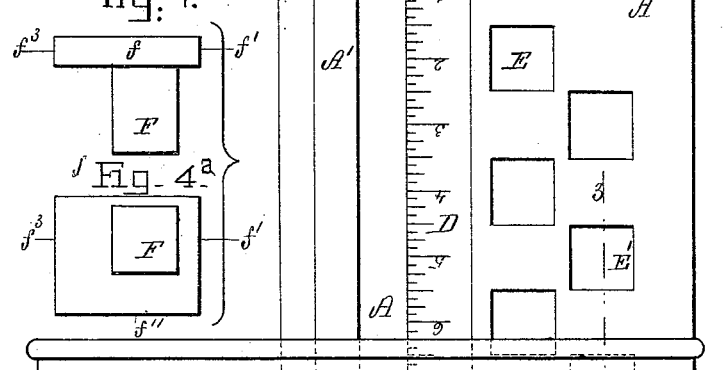
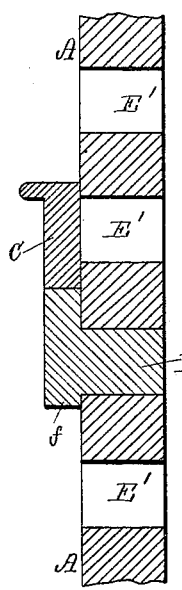
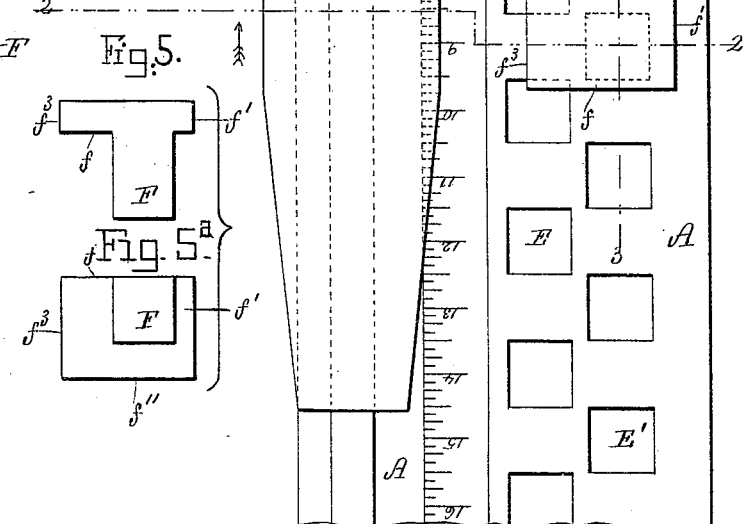
Witnesses.
Inventor.
Benjamin Potter

UNITED STATES PATENT OFFICE.

BENJAMIN POTTER, OF SWAMPSCOTT, MASSACHUSETTS, ASSIGNOR OF ONE-HALF TO ALBERT G. POTTER, OF SAME PLACE.

SAW-GAGE DEVICE.

SPECIFICATION forming part of Letters Patent No. 536,651, dated April 2, 1895.

Application filed January 25, 1895. Serial No. 536,216. (No model.)

*To all whom it may concern:*

Be it known that I, BENJAMIN POTTER, a citizen of the United States, and a resident of Swampscott, in the county of Essex and State of Massachusetts, have invented new and useful Improvements in Saw-Gage Devices, of which the following, taken in connection with the accompanying drawings, is a specification.

This invention relates to improvements in saw gage devices for the purpose of adjusting and setting the gage with great facility and accuracy relative to the saw according to the length or width of the pieces of boards that are to be cut off as will hereinafter be more fully shown and described, reference being had to the accompanying drawings, wherein—

Figure 1 represents a top plan view of the improved gage adjusting device. Fig. 2 represents a cross section on the line 2—2 shown in Fig. 1. Fig. 3 represents a longitudinal section on the line 3—3 shown in Fig. 1. Fig. 4 represents a side view and Fig. 4$^a$, a bottom view of the adjustable gage pin; and Fig. 5 represents a side view and Fig. 5$^a$, a bottom view of a similar gage pin for adjusting the position of the gage.

Similar letters refer to similar parts wherever they occur on the different parts of the drawings.

In Figs. 1, 2 and 3 A represents a metal table top or work support of a sawing machine on which B represents the circular saw as usual. In practice such saw is secured to a shaft journaled in a swinging frame pivoted above or below the table, but as such saw actuating device forms no part of my present invention it is not represented in the drawings. The improved adjustable saw gage device is however equally well adapted for sawing machines having the saw arbor journaled in stationary bearings or other machines without departing from the spirit of my invention.

The table top A is provided with a longitudinal groove A' adapted to receive the projection C' of the adjustable gage C as is common in devices of this kind.

*d* is a longitudinal groove in the top of the table A, in which is located a graduated rule D as shown in Figs. 1 and 2.

In the table A are made a series of perforations E, E, and E', E', arranged alternately in two rows as shown in Figs. 1, 2 and 3. Such perforations are preferably square, although they may be made of cylindrical or other form or shape without departing from the spirit of my invention.

In practice I prefer to make the perforations E, E', one inch in diameter with a space of one inch between such perforations, but I do not wish to confine myself to any particular size of such holes and intervening spaces as this may be varied according to circumstances and requirements.

F in Figs. 3 and 4 represent the shank of the adjustable gage pins adapted to be inserted in the perforations E, E' in the table top A as shown in Figs. 1, 2 and 3. The shank F is made square, round or of other form corresponding to the shape and size of the said perforations E, E'.

The gage pin shank F has a head with graduated faces $f, f', f'', f^3$ as shown in the drawings. In Fig. 3 such faces extend beyond the sides of the shank respectively one eighth, three eighths, five eighths and seven eighths of an inch, or more or less as may be desired. In Fig. 5 one of said faces is preferably flush with one side of the shank F. Another one projects one fourth of an inch, one half of an inch and three fourths of an inch, or more or less beyond the sides of the shank as shown.

In setting the gage to any desired distance from the saw blade, all that is necessary to do is to read off the desired measures on the scale D and place the gage in position accordingly. One of the gage pins is then taken and placed in any of the gage pin perforations E, E', in such a position that one of its faces fits against the back edge of the gage C as shown in Figs. 1 and 3. It will thus be seen that by placing one of the gage pins in one of the table perforations E, E' and adjusting the desired face of the head of such gage pin against the rear of the gage C, the latter will be held at the proper and predetermined distance from the saw according to the size or length of the piece or pieces that are to be sawed off.

What I wish to secure by Letters Patent and claim is—

In a sawing machine a table A having a series of perforations E, E' and a sliding gage C combined with gage pins adapted to fit said perforations and having a head with variable side extensions or faces $f, f', f''$, adapted to serve as adjustable stops for the gage, substantially as and for the purpose set forth.

In testimony whereof I have signed my name to this specification, in the presence of two subscribing witnesses, on this 14th day of January, A. D. 1895.

BENJAMIN POTTER.

Witnesses:
ALBAN ANDRÉN,
LAURITZ N. MÖLLER.